G. F. NORTON AND E. A. ENDE.
CORN SNAPPING MECHANISM FOR SILO FILLERS.
APPLICATION FILED FEB. 26, 1920.
1,423,138.
Patented July 18, 1922.
2 SHEETS—SHEET 1.
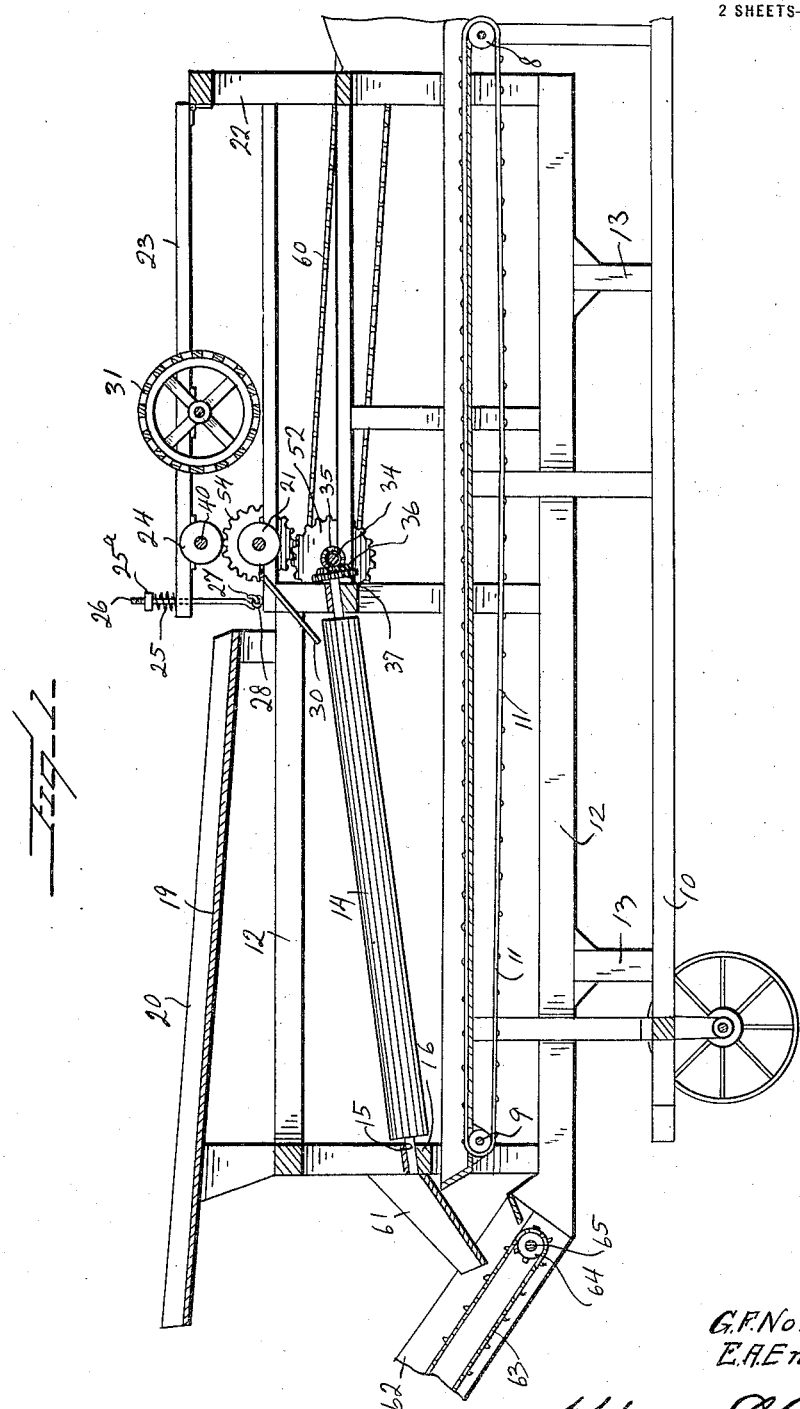
Inventors
G. F. Norton and
E. A. Ende.
By Watson E. Coleman
Attorney

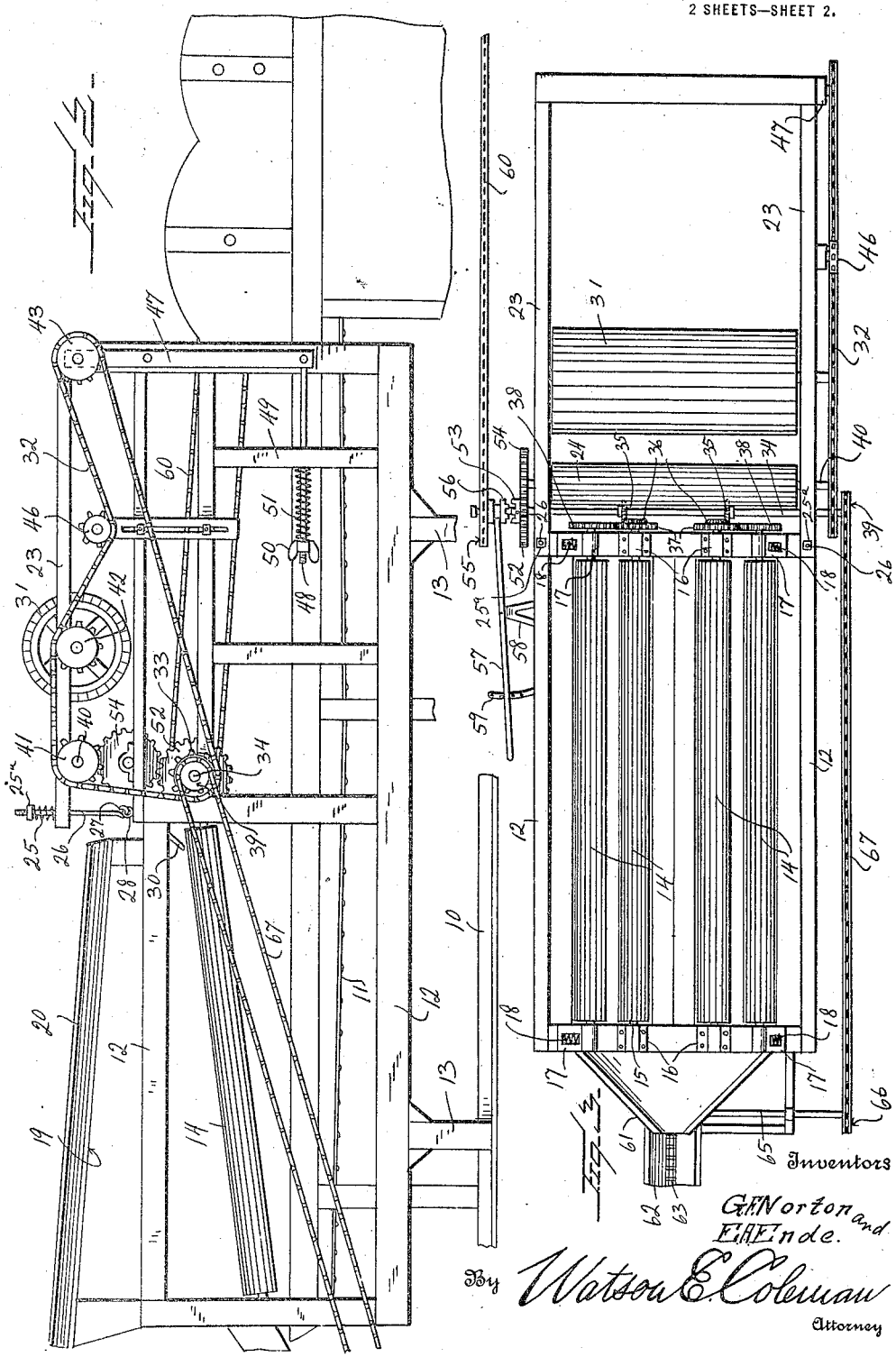

UNITED STATES PATENT OFFICE.

GEORGE F. NORTON AND EDWIN A. ENDE, OF MAYVILLE, WISCONSIN.

CORN-SNAPPING MECHANISM FOR SILO FILLERS.

1,423,138.  Specification of Letters Patent.  Patented July 18, 1922.

Application filed February 26, 1920. Serial No. 361,602.

*To all whom it may concern:*

Be it known that we, GEORGE F. NORTON and EDWIN A. ENDE, citizens of the United States, residing at Mayville, in the county of Dodge and State of Wisconsin, have invented certain new and useful Improvements in Corn-Snapping Mechanism for Silo Fillers, of which the following is a specification, reference being had to the accompanying drawings.

This invention relates to corn stalk stripping and husking machinery, and particularly to that class of machines wherein the ears of corn are snapped from the stalks and then the husks are stripped from the ears, the husks and stalks being carried to suitable cutting or shredding mechanism where they are put in proper condition for use as ensilage, the ensilage then being carried to a silo. A machine of this character is illustrated in Patent No. 890,385.

While complete machines have been devised whereby the ears are stripped from the stalks and the ears husked and the husks and corn stalks chopped up or shredded preparatory to its use as ensilage, yet there is a large class of feed cutters so-called with carriers and blowers for preparing ensilage and filling silos wherein there is no snapping mechanism for stripping the ears of corn from the stalks, nor any husking mechanism, these machines requiring that the snapping and husking shall be done either by means of additional preparing machinery or by hand.

The general object of our invention is to provide a stripping and husking attachment which may be mounted upon the frame of such stalk cutting and carrying devices, as have just been referred to, the attachment being so constructed that the stalks from which the ears have been snapped and the husks stripped from the ears are discharged upon the carrier of the cutter, the attachment being such that no change need be made in the cutting mechanism itself, and the attachment may be driven by power taken from the main mechanism. Thus an ordinary feed cutter, such as is on the market for use in chopping up corn stalks, leaves, etc., and conveying the same to a silo, may be converted into a complete machine wherein the stripping and husking is done by machinery or the stripping and husking machinery entirely done away with when desired.

Another object is to provide a beater roll, upper and lower snapping rolls, and husking rolls all driven by an endless sprocket chain, and provide means whereby the chain may be slackened or tightened to accommodate the movement of the snapping rolls towards or from each other and to urge the snapping rolls towards each other.

Other objects will appear in the course of the following description.

Our invention is illustrated in the accompanying drawings, wherein:—

Figure 1 is a vertical sectional view of an ensilage cutter of a conventional form such as is used with carriers or silo fillers, the view showing our attachment applied thereto;

Figure 2 is a side elevation of the rear portion of the ensilage cutter with our attachment applied thereto;

Figure 3 is a top plan view of the attachment.

We have illustrated in these drawings a portion of an ordinary ensilage cutter of usual form having the usual wheeled frame 10 and a conveyor 11 driven in any suitable or usual manner and supported by a rear roller 8 and a forward roller 9, as is usual in silo fillers. This conveyor ordinarily delivers the corn stalks to the cutters which chop the corn stalks and leaves into short lengths and from these the cut stalks and leaves are carried to the silo by a blower or carrier. The cutters and the carrier or blower are not shown. Detachably supported on the frame of the silo filler is the frame of our attachment comprising the longitudinally extending stringers 12 having legs or supports 13 engaging with the frame of the ensilage cutter, over which it sets, and this frame supports at the rear end of the conveyor 11 of the ensilage cutter, the upwardly and forwardly extending husking rolls 14, these husking rolls being corrugated or otherwise formed in the usual manner, and arranged in pairs, as illustrated in Figure 3. One roll of each pair is movable and urged yieldingly toward the other roll of the pair. Thus, in the drawings, the shaft 15 of one husking roll of each pair of rolls is disposed in fixed bearings 16, while the shafts of the opposite roll of each pair are mounted in movable bearings 17 urged toward the fixed bearings by means of compression springs 18. Thus the husking rolls are urged towards each other but can move away from each other. These husking rolls discharge upon a chute, as will be later stated. Supported upon the frame of the attachment above the husking rolls is a feed table 19 having laterally disposed, downwardly inclined feed boards 20.

Forward of the feed table and mounted upon the frame of the attachment is the lower snapping roll 21, and pivotally mounted upon upwardly extending posts 22 at the forward end of the attachment is a rectangular frame 23 which, at its free end, carries the top snapping roll 24. The free end of this frame 23 is resiliently urged downward by coiled springs 25 surrounding tension bolts 26, the upper ends of which bolts are provided with nuts 25ª, and the lower ends formed with hooks 27 engaging with suitable eyes 28 carried upon the main frame of the attachment. It will be obvious that when the bolts 26 are engaged with the eyes 28, that the springs 25 will be under tension and will urge the frame 23 downward so as to bring the top and bottom snapping rolls 21 and 24 into engagement, and that the tension of the spring may be adjusted by means of the nut 25ª. The resiliently urged frame, however, permits the snapping rolls to move away from each other and permits the passage of the corn stalks between them, the tension of the springs 25 being such, however, that the rolls 21 and 24 will snap the ears of corn from the stalks. These ears, when so snapped from the stalks, will fall upon downwardly and rearwardly extending guides 30 which will direct the ears onto the upper ends of the husking rolls 14, and these husking rolls will strip the husks from the ears of corn. The stripped ears will pass downward on the husking rolls and the husks will pass between the rolls and will fall onto the conveyor 11.

Mounted upon the frame 23 forward of the upper snapping roll 24 is a relatively large beater 31 composed of end disks and transverse wooden bars, which beater acts to press the corn stalks downward and forward and force them onto the conveyor 11 and thus deliver them to the feeding rolls of the silo filler. The upper snapping roll and the beater are driven by an endless sprocket chain 32. This sprocket chain engages a sprocket wheel 33 mounted on a transverse shaft 34 which carries bevelled gears 35 on it engaging with bevelled gear wheels 36 mounted upon the shafts 15 of the fixed rolls 14. These shafts 15 of the fixed rolls carry gear wheels 37 which engage with gear wheels 38 mounted upon the shafts of the movable rolls 14. Also mounted upon the shaft 34 is a sprocket wheel 39 for a purpose to be later stated.

Mounted upon the shaft 40 of the upper snapping roll is a sprocket wheel 41, and on the beater shaft is a sprocket wheel 42. Mounted upon the upper end of a lever 47 disposed on one of the uprights 22 is a sprocket wheel 43, and over this sprocket wheel and the sprocket wheels 42, 41 and 33 passes the sprocket chain 32. The upper flight of this sprocket chain passes beneath the sprocket chain tightener wheel 46, which is mounted upon the frame of the attachment for vertical movement and which is adjustable to take up slack. The lever 47 is pivoted intermediate its length, and the lower end of this lever has extending from it a tension bolt 48 passing through a suitable support 49 and carrying a nut 50. Surrounding this bolt is a coiled spring 51 which bears against the member 49 and against the nut 50 and urges the lower end of the lever 47 inward, that is toward the rear end of the machine. This urges the sprocket wheel 43 forward, tightening the chain 32, and tending to hold the upper sprocket roll in contiguity with the lower sprocket roll 21. This construction permits a whole bundle of stalks to pass between the snapping rolls, which could not be the case were the snapping rolls driven by gears. In our attachment, the lever 47 is the tension lever, and this, together with the tension spring, gives the raising or lowering tension on the upper snapping roll and beater. The chain tightener 46 is designed to take up the extra slack in the drive chain and also holds the chain in its drive course.

For the purpose of driving the mechanism, we mount upon the shaft 34 a gear wheel 52 having a clutch member 53 thereon, this gear wheel and clutch member rotating with the shaft 34 and the gear wheel engaging a gear wheel 54 mounted on the shaft of the lower snapping roll 21. Slidably mounted upon the shaft 34 is a sprocket wheel 55 which carries a clutch member 56 engageable with the clutch member 53 when shifted in one direction, and this combined sprocket wheel and clutch member are shifted outward or inward by means of a lever 57 pivoted upon a suitable bracket 58 extending out from the frame of the machine and moving over a sector 59, the lever having any suitable means whereby it may be locked with the sector in its two adjusted positions. Extending around the sprocket wheel 55 is a sprocket chain 60 which extends to any suitable sprocket wheel on the ensilage cutter, as for instance, a sprocket wheel slipped on the main shaft or the cylinder shaft of any make of silo filler, in a manner which will be obvious.

The stripped ears of corn are discharged into a chute 61, from which extends a relatively narrow elevating chute 62 having therein an elevating chain 63 passing over suitable rolls or sprocket wheels to the upper ends of the chute 62, this chain carrying hooks to engage with the ears of corn as in any ordinary corn conveyor. This chain 63 is driven by a lower sprocket wheel 64 on a shaft 65 carrying a sprocket wheel 66, in turn driven by a sprocket chain 67 extending around a sprocket wheel 39 on shaft 35. Thus all of these parts are driven by the driving chain 60.

The operation of this mechanism will be understood from what has gone before. It may be noted, however, that the snapping roll frame is extended out further than the width of the husking rolls, the length of the snapping rolls in actual practice being about 30″. This device is particularly convenient because it is in the form of an attachment which can be set over an ordinary ensilage cutter and the carrier thereof without changing any mechanism on the ensilage cutter whatever, and the advantages are that with this machine the snapping rolls are not driven by gears and are mounted so that the rolls may be urged toward or from each other, thus preventing any breaking of the gears or any chance of the machine becoming clogged. Furthermore, the tension bolts 26 may be readily released and the frame raised and laid forward, making it very easy to get at the husking roll gears. With this construction, the snapping of the ears from the corn stalks is readily accomplished and the stripped ears are discharged into a wagon, while the husks, stalks and like parts are carried forward in the usual manner by the conveyor 11 and discharged into the cutting or chopping rollers of an ensilage cutter. It does not make any difference how close the attachment is set to the cutting rollers of the ensilage cutter so long as the chute clears the rear end of the conveyor 11.

In the practical construction of this device, the husking rolls will be about 42″ long and the remainder of the attachment will be about 38″ long, and thus there is ample room between the cutters of the ensilage cutter and the end of the conveyor 11 to place our attachment on the frame of the ensilage cutter without altering anything on the ensilage cutter. The beater presses the stalks downward upon the conveyor 11 and thus the stalks are caught by the cutters or other mechanism of the ensilage preparing machine and the stalks have no chance to rest before they are caught by the cutting mechanism of the ensilage preparing machine, making the operation of the device very positive and preventing any accumulation of stalks is front of the cutters of the ensilage machine.

While we have illustrated a specific form of our mechanism which we have found in practice to be thoroughly convenient and effective, yet we do not wish to be limited to the exact construction illustrated, as changes might be made therein without departing from the spirit of the invention.

We claim:—

In a corn husking machine, the combination of a bottom frame work support having longitudinally extended horizontal side bars, a conveyor to operate substantially throughout the length of said frame work, an upper frame having laterally and longitudinally spaced standards resting removably upon said side bars, corn feeding and husking mechanisms mounted upon the forward portion of said upper frame and over the forward portion of said conveyor, snapping means and stalk deflecting means mounted on the rear portion of said upper frame and over the rear portion of said conveyor whereby both the husks and the stalks are received on said conveyor.

In testimony whereof we hereunto affix our signatures.

GEORGE F. NORTON.
EDWIN A. ENDE.